UNITED STATES PATENT OFFICE.

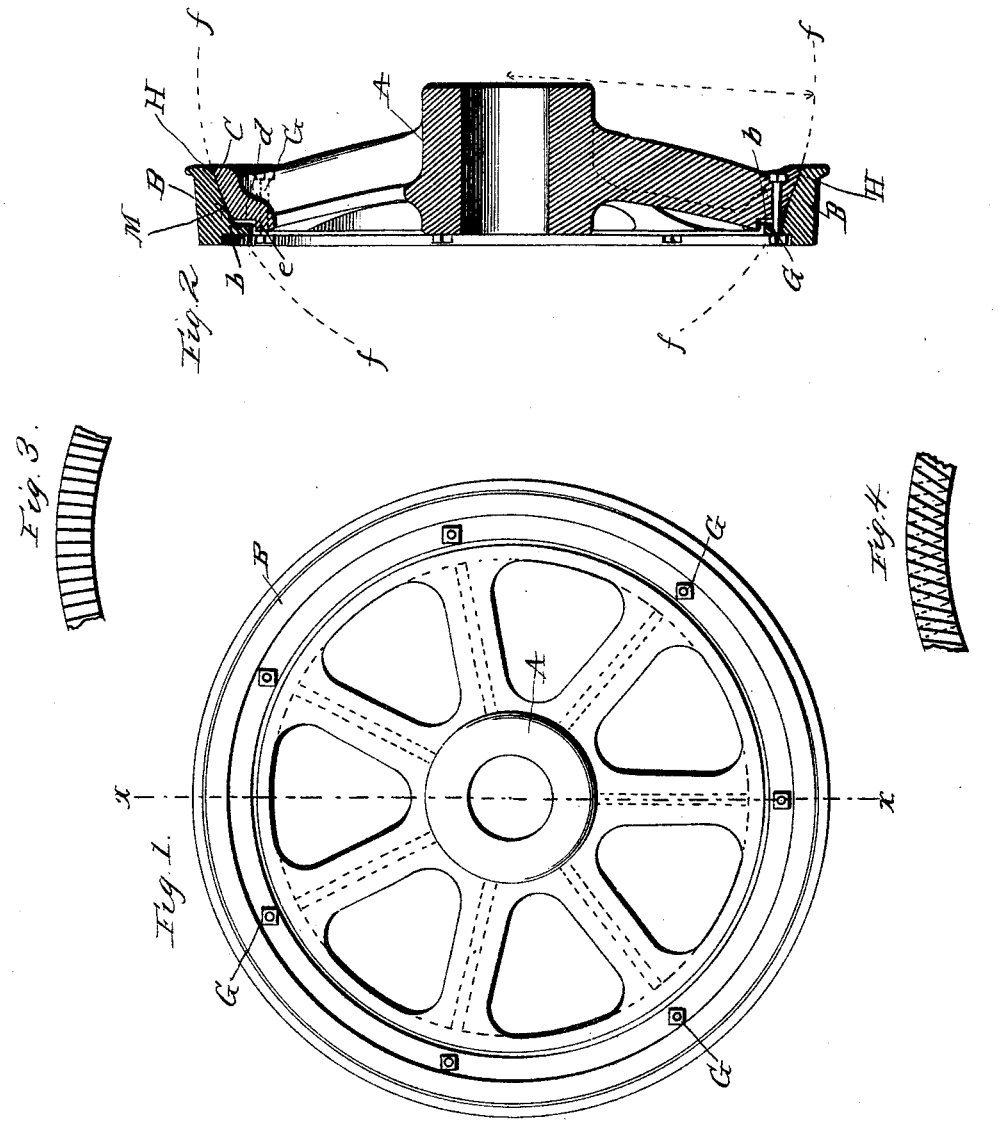

WILLIAM JOSLIN, OF CLEVELAND, OHIO.

CAR-WHEEL.

SPECIFICATION forming part of Letters Patent No. 414,223, dated November 5, 1889.

Application filed July 31, 1889. Serial No. 319,290. (No model.)

*To all whom it may concern:*

Be it known that I, WILLIAM JOSLIN, a citizen of the United States, residing at Cleveland, in the county of Cuyahoga and State of Ohio, have invented certain new and useful Improvements in Car-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to car-wheels, and is designed particularly as an improvement on Patent No. 311,837, granted me February 3, 1885, and on that class of wheels in which the wheel is composed of a rim and a central portion.

The object of the invention is to provide in effect a ball-bearing between the rim and the central portion of the wheel, whereby the rim can be adjusted to run perfectly true and a uniform bearing between it and the said center will be maintained, thereby preventing any crowding or binding between said rim and center in that class of wheels in which the bearing is straight.

A further object of the invention is to obtain an increased thickness of rim without adding to the weight of the completed wheel or making the wheel appear cumbersome.

The foregoing advantages are attained by the novel construction which hereinafter will be more fully described and claimed, and which is shown in the annexed drawings, in which—

Figure 1 is a side view of a wheel embodying my invention. Fig. 2 is a vertical section on the line X X of Fig. 1. Fig. 3 is a modification showing radial grooves in the bearing-surface between the rim and center. Fig. 4 is a further modification showing oblique grooves in the bearing-surface, the grooves being arranged to cross each other.

A is the center of the wheel, and B the rim. The periphery of the center A is formed on the arc of a circle whose center is to one side of the plane of the wheel and on the axis thereof, or a prolongation of the axis. The inner periphery of the rim B is correspondingly curved in cross-section, so that a close joint will be obtained between the rim and center when placed together. Obviously the rim can be adjusted on the center A to true the said rim without any binding between it and the center, and a uniform and even bearing will be had by reason of the curved bearing, (indicated by the dotted lines F F.) The rim B has an inner or vertical flange $b$, and the center A a lateral or horizontal flange $e$ and a vertical wall $d$ opposite the flange $b$ of the rim. A space of sufficient width to admit of the relative adjustment of the rim and center is left between the opposite sides of the flange $b$ and the wall $d$ and flange $e$, as clearly shown in Fig. 2. The rim B is held on the center A by fastenings, as bolts G, which pass through the flange $b$ and the center A, substantially as shown. By reason of the curved bearing between the rim and center the rim is heavier or thicker at the point where the greatest strain comes (see arrow M, Fig. 2) than would be the case if the bearing were straight.

To prevent vibration and deaden the noise, packing H is placed between the rim and center. This packing is preferably paper, and to make it serve the purpose of holding the rim against movement on the center either the bearing-surface of the center or rim, or both, may have grooves therein, into which the packing is pressed when the rim is drawn by the bolts G onto the center. In Fig. 3 the grooves are shown as running radially, and in Fig. 4 as extending obliquely, so that when the rim is placed on the center the grooves in the periphery of the said center will cross the grooves in the rim.

I claim—

1. The combination, with the center A, having its periphery curved in cross-section on the arc of a circle whose center is to one side of the plane of the wheel and in line with the axis of said wheel, of the rim having its inner periphery correspondingly curved in cross-section, whereby the rim and center can be relatively adjusted and preserve a uniform and even bearing between them, and means, as the bolts G, for drawing the rim on the center, substantially as set forth.

2. The combination, with the center having its periphery curved on the arc of a circle in cross-section and having the vertical wall $d$, of the rim having its inner periphery correspondingly curved and having the vertical flange $b$, a space being left between the opposing sides of the flange $b$ and wall $d$, and means, as bolts G, for drawing the rim on the center and securing it in place, substantially as described.

3. The combination, with the center and the rim having a curved bearing-surface between them and grooves between the said bearing-surface, of packing between the rim and center, and the bolts for drawing the rim on the center and pressing the packing into said grooves, substantially as described.

4. The combination, with the center and the rim having a curved bearing-surface between them and having oblique grooves, the grooves in the rim extending across the grooves in the center, of packing between the rim and center, and the bolts for drawing the rim on the center and pressing the packing into said grooves, substantially as set forth.

In testimony whereof I affix my signature in presence of two witnesses.

WM. JOSLIN.

Witnesses:
S. A. TERRY,
WILL MUIRHEAD.